R. WAGNER.
SUSPENDED HIGH SPEED RAILWAY.
APPLICATION FILED NOV. 7, 1919.
1,422,394.
Patented July 11, 1922.
2 SHEETS—SHEET 1.
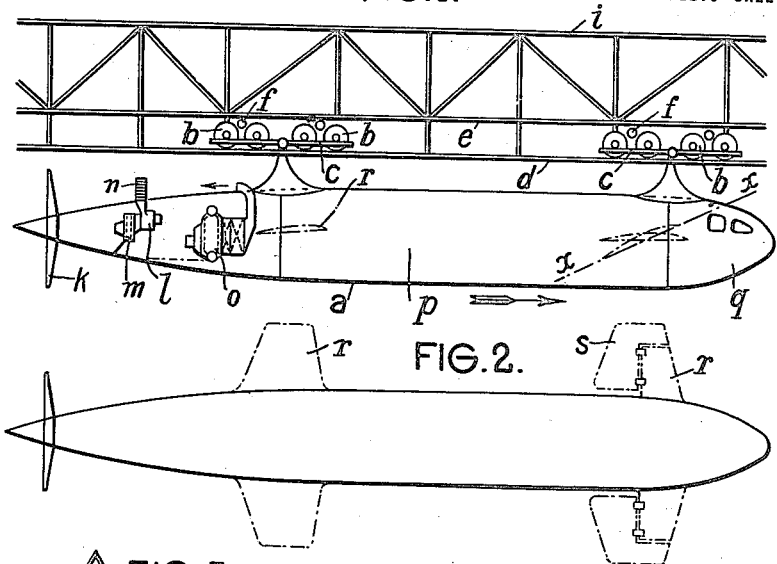
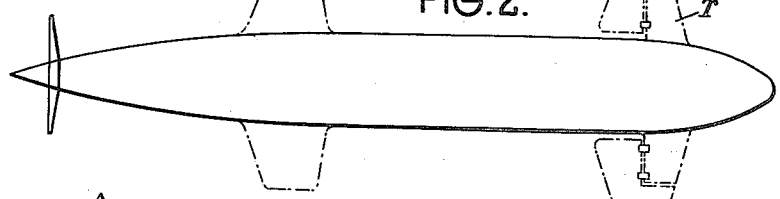
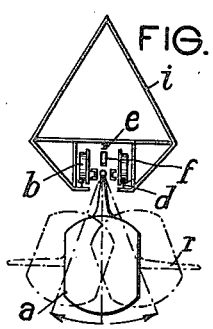
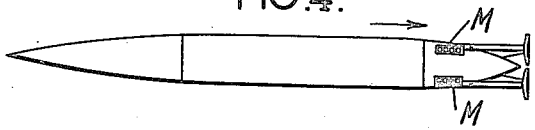
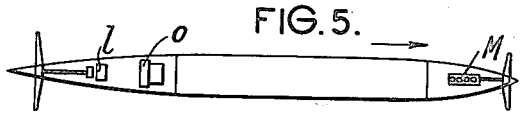
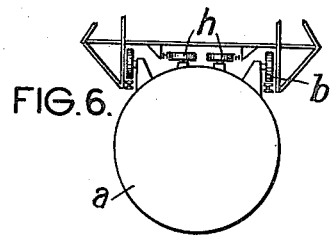
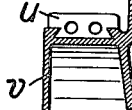
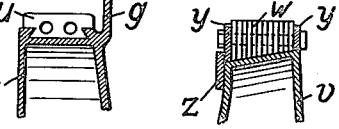
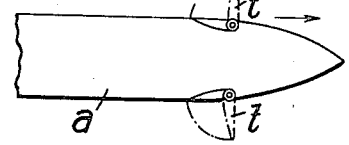
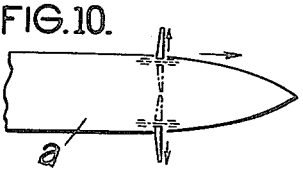
Heinrich Oehlotz
Hans Piel
witnesses.
Rudolf Wagner.
inventor.

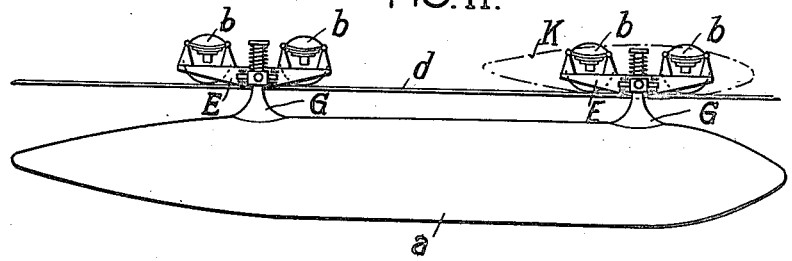
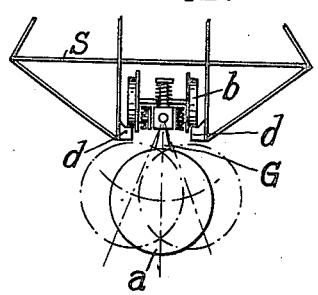
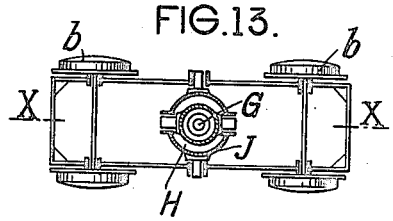
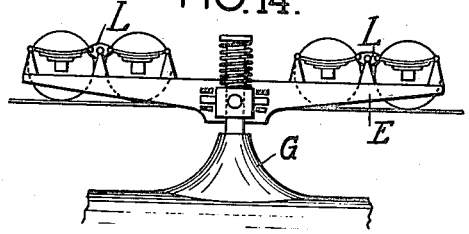
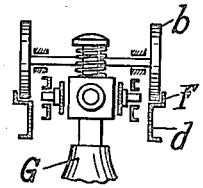
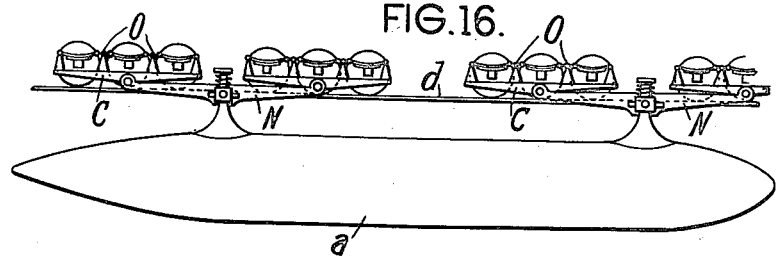

UNITED STATES PATENT OFFICE.

RUDOLF WAGNER, OF HAMBURG, GERMANY.

SUSPENDED HIGH-SPEED RAILWAY.

1,422,394. Specification of Letters Patent. Patented July 11, 1922.

Application filed November 7, 1919. Serial No. 336,407.

*To all whom it may concern:*

Be it known that I, RUDOLF WAGNER, chief engineer, a citizen of the Free State Bavaria, Germany, residing at Hamburg, 105 Bismarckstrasse, Germany, have invented certain new and useful Improvements in Suspended High-Speed Railways, of which the following is a specification.

The suspended railways hitherto constructed or suggested have been designed for comparatively low speeds as, for instance, of from 25 to 40 kilometers per hour at most, as they are usual in the suburban traffic, and as are, indeed, only suitable for such traffic. On the other hand speeds, for instance, from 200 to 300 kilometers per hour, for the long distance rapid traffic, are not to be attained, by means of the existing systems, as the fundamental impediment to the attainment of high speeds is inherent, as in the case of the urban- or city-railways, in the special propulsion of the car or train by the effect of adhesion, i. e. by wheel-drive. A certain amount of adhesion or power of traction requires, as is well known, a minimum weight for the locomotive, be it of the steam- or electrically driven type, and for that reason also a corresponding weight of the car. With the increase of speed in relation to the above-mentioned value, these weights would rise to such an extent, that it would require an enormously heavy railroad-system and a superstructure so expensive, as to perfectly exclude an economic working. Further must be considered the concussions and shocks which become more and more disagreeable, as the weight of the locomotive or car increases, on account of the irregularities of the track, rail-joints, etc., which in conformity with the experience made with ordinary railways exclude an acceleration of speed over, say 150 kilometers per hour. These drawbacks can partly be attributed to the necessity of providing the drive- or free-wheels with metal-tyres which necessity is a natural consequence of the high weight of the car.

In the case of the present invention the method of propulsion hitherto applied to railways, has been abondoned and has been replaced by propelling the car by means of air-propellers, such as are employed with flying-machines. The necessary attainment of an adhesion effect by carrying considerable dead-weights has therefore been obviated and the car can be constructed as lightly as for instance the bodies of flying-machines and yet stand the stress of the dead loads, its own weight, the weight of the propelling-motor, as well as that of the movable useful load, i. e. of passengers and goods, furthermore the stress caused by external forces, such as the thrust of the propeller, lateral wind-pressure, etc. It is self-evident that, when employing this method of propulsion, the weight-unit of the motor per H. P. can be considerably reduced as compared with the method of propulsion hitherto employed, and that such propelling-machines as have been used in conjunction with flying-machines, can be most advantageously applied, as for instance, a light steam-turbine installation with air-cooled condenser, or one or several petrol-motors for flying-machines, or very light electro-motors, if necessary, with reducing-gear, or the like.

Owing to these factors the total dead-weight to be carried per person or per ton of goods, amounts to only a comparatively inconsiderable fraction of the corresponding amount of, for instance, an express-car including the locomotive, whereby the machine-effect is again reduced, and the superstructure can be of so light and widely spread a construction that the economic overcoming of long distances at a high speed is technically realizable and capable of yielding a profit at adequate fares.

The low weight of the car and the low load on the wheel resultant therefrom, renders it further possible to employ, instead of the steel-wheels used up to the present, a somewhat more yielding tyre, be it by providing the felloes of the running-wheels with a material somewhat more yielding and yet capable of sufficient support, as for example ebonite, raw or untanned skin, cork or the like, or with a strong pneumatic. In this way a steady run, free from shocks even at the highest speed is achieved and, at the same time, the track, as well as the body of very light construction are secured from vibrations as far as possible. The influence of the irregularities of the rails or rail-joints, which has so far partly put a limit to attaining higher speeds, will thereby be considerably reduced. The load of the superstructure and the wheels, as well as the rolling friction during the journey, can, in the case of the improvement under consideration, be further reduced by balancing the body, perhaps, by means of bearing or supporting planes, similar to those of a flying-machine. With regard to the intended high speed, and the considerable buoyancy-effect caused thereby, it will be sufficient to provide one or more fairly short stumps of supporting planes, so as not to impart to the railway-profile or section a too unfavorable formation. They can be attached to the car-body one behind or above the other. Moreover, a maximum-relief of ½ to ⅓ of the car-weight is quite sufficient, as otherwise the stress on the superstructure would be too high, when the car is stopping.

In consideration of the necessary absolute security from derailing at the high speed, and the skidding in curves coupled with the oblique position of the car, a high speed-railway of this kind can only be constructed in the form of a suspended railway. Only in this case it is possible to obtain full freedom in the necessary oblique position of the car, either by freely adjusting it only upon one rail or otherwise movably suspended, or, if the car, suspended upon 2 rails, is rigidly connected with the carriage, by giving the rails a position of sufficient inclination in the curve. Further, efficient safeguards against derailing can be provided, while a displacement of the track is less to be feared than would be the case with a track laid on an ordinary road-bed. Besides, the suspended railway is more advantageous, because only an insignificant percentage of the ground is required for foundations of the superstructure - supports when compared with that required by the bed of an ordinary railway. In the innovation under notice this advantage has been accentuated by the fact that the superstructure is of an extremely light and widely spread construction.

The drive of the car-body by means of air-propellers embodies the further advantage that it is conducive to a very gentle, gradual acceleration of the car, in contradistinction to the jerky acceleration of speed in the case of an electrically driven car. Moreover, a very effective brake-power is developed by causing the propeller to run backwards, without any damage to wheel or track whatsoever. In regard to the diameter of the propeller, it can be considered a very favorable factor that the propeller for the intended high speed and the comparatively low resistance against the forward-motion can be given dimensions which are altogether admissible and do not render the car-profile unfavorable.

Figure 1 is an elevation of an apparatus embodying my improvement; and Figure 2 is a diagrammatic plan view of the car body shown in Figure 1.

Figure 3 is a transverse section of the apparatus illustrated in Figure 1 taken at the point indicated by the letter P. and looking toward the arrow. Figures 4 and 5 illustrate, diagramatically, two modes of propulsion of the car body, the latter figure illustrating anterior and posterior propellers.

Figure 6 illustrates a manner in which the car body may be rigidly connected at two lateral points to the running wheels.

Figures 7 and 8 show two different modes of applying an elastic running surface upon the peripheries of each running wheel.

Figure 9 and Figure 10 show respectively, and in diagramatic form, resistance planes which may be adjusted flush with the car body, the planes in the first figure being pivoted, and seated in pockets formed in the car body surface when not in action, and the planes in Figure 10 being movable within the car body through openings formed in the latter.

Figure 11 is an elevation illustrating the car body supported upon a track-way, one rail being shown, by means of a special truck construction, hereinafter described in detail.

Figure 12 is a transverse section of Figure 11 at the point marked $a$, looking toward the right of the figure.

Figure 13 is an elevation of the truck structure, diagramatically shown.

Figure 14 is an enlarged elevation of the truck structure and its immediate connecting parts, Figure 15 is a transverse sectional view of the same taken at a point immediately to the left of the member G., Figure 14, and looking to the right of the said figure.

Figure 16 is a side elevation, similar to Figure 11, with the exception that the number of trucks is increased.

Figs. 1–16 (Sheets 1 and 2) represent different examples of construction and details of the innovation under notice.

In Fig. 1 (elevation), Fig. 2 (perspective view) and Fig. 3 (section) $a$ represents the running body, which, in consideration of the high speed, has been given a torpedo-like or otherwise aerodynamically advantageous shape, of circular or any other suiatble section (for example flattened off at the sides for more conveniently providing vertical stiffening ribs, or elliptical, if an especially large room for passengers at not too great a length of the car-body is to be provided etc.). The body $a$ can, if necessary, be suspended to the carriage $c$, $c$ provided with running wheels $b$, $b$ at several, most suitably however, at only two points, either with full lateral play as in Fig. 3 or rigidly connected as for instance indicated in Fig. 6.

Examples of construction for the swinging suspension are illustrated in Figs. 11–16 described below. In consideration of the high speeds, special care is to be given to the construction of the guide-rail or rails, which may consist, in accordance with suggestions already known, of one and two or more rails. According to the example represented in Figs. 1–3, two lower rails $d$ and one upper counter-rail $e$ as safeguard against a possible derailing of the carriage from the rails $d$ are shown. The carriages $c$ may be, for the latter purpose, provided with special counter-rollers $f$ which in ordinary run do not touch the upper rail. The lateral guide of the carriages can either be effected in the usual manner by means of wheel-flanges $g$ (Fig. 7) with which the wheels $b$ are provided, or by means of a lateral flange or elevation on the rails, or with the aid of special lateral rollers or trolleys $h$, rigidly or flexibly connected, as approximately indicated in Fig. 6. As carrier of the whole of the rail-system or track, a suitably constructed superstructure of the frame work-type, as for instance parallel-girders $i$ with triangular or rectangular sections, may be used.

The drive of the body $a$ is effected, according to the innovation under notice, by means of one or several air-propellers which are attached at the forward or backward end, or at both ends of the body. Fig. 1 shows the application of only one propeller $k$ at the rear, which may be driven by a high-speed steam turbine $l$ with reduction-gear $m$. $n$ is the air-cooled condenser, $o$ the steam-generator, provided, if required, with super-heater, feed-water and air-heater, the steam-generator being most suitably heated with oil. The waste gases escape in the direction of the arrow. Next to the engine-room, forward, a room or chamber $p$ for passengers or goods, to which is attached the driver's cabin $q$, may be arranged.

In accordance with Fig. 4 (ground-plan) two anterior traction propellers actuated by means of petrol-motors M, have been provided, in accordance with Fig. 5 (ground-plan) one anterior and one posterior pressing propeller, of which the former, as an auxiliary propeller for low speed-journeys, is actuated by a petrol motor M, while the posterior propeller is used for rapid journeys and driven by a steam-turbine $l$. The arrangement according to Fig. 4 will be found specially suitable, where a very high speed is not required (as for instance, for suburban and garden-city traffic) and petrol-motors, such as in flying machines, may be employed for that reason. These motors are installed within the conductor's cabin and can therefore be more conveniently supervised by the crew than if being installed at the rear of the car. The arrangement and the number of the propellers naturally depend upon the particular conditions and the selected method of propulsion. When employing steam-turbine drive, double-propellers rotating in opposite direction with shafts fitting one into another, of which each one may be driven by a separate steam-turbine, will be found most suitable whereby, apart from a certain increase of the propeller effect, the advantage of a greater reliability of service in case one of the turbines fails, is secured, as well as that of a smaller diameter of the propellers.

It stands by reason that for the purpose of actuating the propellers, instead of a steam- or gas-turbine, or petrol-motor a high-speed electro-motor (if necessary, with reducing-gear) may be used, which is fed by means of a long distance line. The possibility of employing such high-speed electro-motors will naturally depend upon the question, as to whether it will be possible to construct motors which, although of a very low weight, are of a comparatively high capacity, further upon the question, as to whether the current-feed from the long-distance wire will be secured at high speeds.

In certain cases, as for instance, when overcoming considerable upward slopes at a low speed, the drive of the air-propellers can be connected with the usual drive of the run-wheels, by transferring transitorily the whole or part of the effect produced by the motor to the whole or part of the running wheels in any suitable manner, for instance, electrically. In this way the advantages of both methods of propulsion are combined, as, when taking upgrades or with a strong head-wind, or for the purpose of accelerating the starting speed, the wheel-drive is thrown in, while the air-propellers serve for the ordinary rapid run along straight lines or when taking moderate upward slopes.

Figs. 1–3 indicate, marked with dashes, short, stump-like supporting planes $r$ for relieving the superstructure, reducing the rolling-friction and absorbing lateral oscillations of the body. These supporting planes can be attached to the running body, as with flying-machines, singly or one above the other, or one behind the other. Moreover, they can also be used as a rapid brake, by providing them, as indicated in Figs. 1 and 2, with a balancing-rudder $s$, which in order to act as a brake, is brought into the position indicated by the broken line $x$—$x$ (Fig. 1).

For the same purpose special resistance-planes $t$ (Figs. 9 and 10) may be provided which, in accordance with Fig. 9, are either turned out of the covering of the body about an axis transverse to the longitudinal direction of the latter, or in accordance with Fig. 10 about an axis parallel to the longitudinal direction of the body. Instead of a rotation, a parallel displacement can naturally be provided.

Figs. 7 and 8 show details of a somewhat elastic tyre of the run-wheels. As there are no such irregularities as, for instance, in a road, a material of a comparatively low degree of resilience, such as laminated (veneer) wood plates or lamellas of raw skin, cork, ebonite, paper or such like, will be sufficient which materials, on the other hand, in consideration of the lowest possible rolling resistance, do not show too much deformation. Fig. 7 shows, for instance, such lamellas *u* arranged in layers in the peripheral direction and held in position in the wheel-body *v* by a swallow-tail, while in Fig. 8, the lamellas are arranged in the plane of the wheel and connected by special terminal plates *y* to a felloe *w* which can be detached from the wheel-body *v*. A ring *z* serves for holding this felloe in position upon the wheel-body *v*.

If the running bodies or cars are of very low weight, the above-mentioned tyre-materials may be replaced by strong pneumatics or solid rubber-tyres.

In the constructional examples according to Figs. 11–16 (Sheet 2) for the freely swinging suspension of the body or car between wheel-pairs, *a* indicates the torpedo-like body, *d, d* the double rails, S the superstructure. *b, b* are either driven or only carrying run wheels which, according to the suggestion contained in Fig. 11, are attached in elastic bearings to 2 or more swivel-carriages covered, if necessary, in a torpedo-like shape, in accordance with K, in order to reduce the air resistance to a minimum.

The suspension of the car *a* is effected according to Figs. 11–16 by means of two or more strong crank-pins G G situated in the vertical central-plane of the car, which touch the centre-piece H of the Cardan joint and are rotatable about a vertical axis and, if necessary, permit of an axial displacement for the purpose of providing vertical shock absorption.

The suspension of the car *a* to the carriages is therefore such, that it permits of rotating in all directions in a plane X—X between the wheel-pairs, so that the carriages can adjust themselves in each moment to the unevenness and curvature of the track or to irregularities of the wheels, and the body, as indicated in Fig. 12 by dotted lines, especially when taking a curve, can freely adjust itself laterally under the influence of centrifugal force.

Instead of providing four pairs of wheels only, cars or bodies of larger size can be provided, as shown in Fig. 14, with eight or even more wheel-pairs, in which case the axial pressure of every two pairs of wheels may be equalized by means of a double-lever L.

Fig. 15 represents an example of the lateral guide of the swivel-carriages in which, instead of the usual flanges of the wheels *b*, a lateral elevation F of the rails *d* has been provided.

According to Fig. 16, twelve pairs of wheels have been assumed, three of which are each attached to a special small carriage C. Every two of such carriages are jointedly connected by means of a double-lever N having the shape of a scale-beam; furthermore the pressure of the separate pairs of wheels may be equalized by short swing-bolsters O which rest against the plate-springs of the wheels, whereby a perfect equalization of the pressure of the whole wheel-system is ensured. The carriages C may also be connected with the double-lever N by a Cardan-joint or only be rotatable about a horizontal transverse axis.

The rotation of the carriages E (Fig. 11) or C and of the double-lever N (Fig. 16) about a vertical axis for the purpose of adjusting themselves to the curvature of the track, may in certain circumstances be dropped, if the lateral guide of the carriages has been effected in such a manner, that only one pair of wheels of each carriage is provided with wheel-flanges, or that this pair of wheels, if the rails are provided with lateral elevations or surmounting parts, cannot be displaced laterally. The other pairs of wheels must, in the latter case, naturally be supported by bearings which allow of their lateral displacement, so as to conform to the curvature of the track. In consideration of the comparatively large radii of curve which are indispensable with the intended high speeds, this simplified method of jointing may be feasible.

Apart from the aforestated examples of construction, the innovation under notice can be carried out or arranged in any other desired manner (for instance, with regard to construction and number of the propellers, other methods of driving, suspension of the cars, etc.) without departing from the spirit of this invention.

What I claim and desire to secure by Letters Patent of the United States, is:

1. A suspended high speed railway, comprising a car of aerodynamically favorable shape, means for propelling the car comprising a motor and a propeller connected thereto, parallel rails, two or more trucks, each truck comprising a rigid frame supported upon two or more pairs of opposed wheels, and a single rigid connecting member between each truck and the car body, the said member being located substantially midway between the rails and being so mounted as to permit movement of the car body in directions transversely of the said track.

2. A suspended high speed railway, comprising a car of aerodynamically favorable shape, means for propelling the same including a motor and a propeller connected therewith, parallel rails, two or more trucks, each truck comprising a rigid frame supported upon two or more pairs of opposed wheels, resting upon the said rails, and a single rigid member connecting each truck with the car body, the said member being located substantially midway between the rails and being so mounted as to permit movement of the car body in transverse directions.

3. A suspended high speed railway, comprising a car of aerodynamically favorable shape, and means for propelling the same including a motor and a propeller connected therewith, parallel rails, two or more trucks, each truck comprising a rigid frame supported upon two or more pairs of opposed wheels resting on said rails, a block mounted on each truck for movement in transverse directions, and a single rigid connecting member intermediate the car body and each block.

4. A suspended high speed railway, comprising a car of aerodynamically favorable shape, and means for propelling the same including a motor and a propeller connected therewith, parallel rails, two or more trucks, each truck comprising a rigid frame, supported upon two or more pairs of opposed wheels resting on said rails, a block mounted on each truck for movement in transverse directions, and a single rigid connecting member intermediate the car body and each block, and means whereby the car body is permitted a slight vertical movement relatively to the said block.

5. A suspended high speed railway, comprising a car body of aerodynamically favorable shape, means for propelling the said car body, parallel rails, two or more trucks, each truck comprising a rigid frame mounted upon two or more pairs of opposed wheels resting on said rails, a block supported by each truck for movement in transverse directions, a single bar slidably movable in each block and rigidly connected to the car body, and a yielding connection between the block and said bar for permitting vertical movement of the car body.

6. A suspended high speed railway, comprising a car of aerodynamically favorable shape, means for propelling the same, parallel rails, two or more trucks, each truck comprising a rigid frame supported upon two or more pairs of opposed wheels resting on the said rails, a rail midway between and above said parallel rails, counter rollers carried by the said trucks for engagement with the said upper rail, and rigid connecting members intermediate the car body and the said trucks.

7. A suspended high speed railway, comprising a car of aerodynamically favorable shape, means for propelling the car, parallel rails, two or more trucks, each truck comprising a rigid frame supported upon two or more pairs of opposed wheels resting on the said rails, a connection intermediate each truck in the car body, and planes carried by the car body, the said planes being adjustable upon an axis transversely of the longitudinal axis of the car body.

8. A suspended high speed railway, comprising a car of aerodynamically favorable shape, means for propelling the car, parallel rails, two or more trucks, each truck comprising a rigid frame supported upon two or more pairs of opposed wheels resting on the said rails, a connection intermediate each truck in the car body, and resistance planes normally disposed in pockets formed in the car body so as to be flush with the latter, and movable into positions transversely of the longitudinal axis of the car body.

In testimony whereof I affix my signature in presence of two witnesses.

RUDOLF WAGNER.

Witnesses:
HEINRICH OEHLERTZ,
HANS PIEL.